United States Patent
Tran et al.

(10) Patent No.: US 12,536,676 B2
(45) Date of Patent: Jan. 27, 2026

(54) METHOD AND SYSTEM FOR DETECTING AND CORRECTING MISALIGNMENT OF MEDICAL IMAGES

(71) Applicant: CurveBeam AI Limited, Melbourne (AU)

(72) Inventors: Khue Tran, Melbourne (AU); Xiaoxu Li, Melbourne (AU); Chao Sui, Melbourne (AU); Yu Peng, Melbourne (AU)

(73) Assignee: CURVEBEAM AI LIMITED, Melbourne (AU)

( * ) Notice: Subject to any disclaimer, the term of this patent is extended or adjusted under 35 U.S.C. 154(b) by 0 days.

(21) Appl. No.: 18/528,008

(22) Filed: Dec. 4, 2023

(65) Prior Publication Data

US 2025/0182303 A1 Jun. 5, 2025

(51) Int. Cl.
*G06T 7/00* (2017.01)
*G06T 5/50* (2006.01)
(Continued)

(52) U.S. Cl.
CPC .................. *G06T 7/30* (2017.01); *G06T 5/50* (2013.01); *G06T 7/0012* (2013.01); *G06T 7/11* (2017.01); *G06T 2207/20221* (2013.01)

(58) Field of Classification Search
CPC ......... G06T 2207/10081; G06T 7/0012; G06T 7/33; G06T 2207/10072;
(Continued)

(56) References Cited

U.S. PATENT DOCUMENTS 8,385,687 B1 2/2013 Blais-Morin
2007/0167801 A1* 7/2007 Webler ................... G06T 19/00
600/459

(Continued)

FOREIGN PATENT DOCUMENTS

WO 2009137652 A1 11/2009

OTHER PUBLICATIONS

Examination Report No. 1 for corresponding Australian Application No. 2023274231 dated Dec. 20, 2023, 6 pages.
(Continued)

*Primary Examiner* — Li Liu
(74) *Attorney, Agent, or Firm* — Faegre Drinker Biddle & Reath LLP

(57) ABSTRACT

A method and system for correcting misalignment of, or of aligning, images of one or more portions of a subject, the images obtained by a two- or three-dimensional medical imaging modality. The method comprises: in consecutive first and second two- or three-dimensional sub-volume scans, (a) identifying at least one first portion and at least one second portion respectively of a common anatomical feature or structure, and/or (b) determining first and second axes of objects (such as anatomical features or structures, or portions thereof) in the first and second sub-volume scans, respectively; determining, based on those portions, or based on the axes, a transformation that aligns or brings into registration the portions; aligning the first and second sub-volume scans by applying the transformation and forming aligned first and second sub-volume scans; generating an aligned image from the aligned first and second sub-volume scans; and outputting the aligned image.

31 Claims, 7 Drawing Sheets

(51) Int. Cl.
  *G06T 7/11* (2017.01)
  *G06T 7/30* (2017.01)

(58) Field of Classification Search
  CPC . G06T 2207/10116; G06T 2207/30004; G06T 2200/04; G06T 2207/20221; G06T 3/14; G06T 7/13; G06T 2207/20212; G06T 7/0014; G06T 7/38; G06T 17/00; G06T 7/10; G06T 7/30; G06V 2201/03; G06V 10/761; G06V 20/695
  See application file for complete search history.

(56) References Cited

U.S. PATENT DOCUMENTS

| | | | |
|---|---|---|---|
| 2012/0288177 A1* | 11/2012 | Wang | G06T 11/008 382/294 |
| 2016/0321809 A1* | 11/2016 | Chukka | G16H 30/20 |
| 2019/0122363 A1 | 4/2019 | Greveson | |
| 2021/0398299 A1 | 12/2021 | O'Connor et al. | |
| 2023/0052401 A1 | 2/2023 | Palma et al. | |
| 2023/0135757 A1* | 5/2023 | Bauer | A61B 8/483 600/424 |
| 2025/0022149 A1* | 1/2025 | Anderson | G06V 10/7625 |

OTHER PUBLICATIONS

Examination Report No. 2 for corresponding AU Application No. 2023274231 dated Apr. 30, 2024, 5 pages.
Notice of Acceptance for AU Application No. 2023274231 dated Oct. 15, 2024, 4 pages.

* cited by examiner

METHOD AND SYSTEM FOR DETECTING AND CORRECTING MISALIGNMENT OF MEDICAL IMAGES

FIELD OF THE INVENTION

The present invention relates to an image analysis method and system, of particular but by no means exclusive application in detecting misalignment of, correcting misalignment of, or aligning, images of one or more portions of a subject obtained by a medical imaging modality, such as Computed Tomography (CT) including cone beam CT, multi-energy CT and multi-detector-row CT, Magnetic Resonance Imaging (MRI), X-ray imaging, and Ultrasound imaging, in each case whether weight-bearing (such as when the patient is bearing weight on the body part being imaged, e.g. while standing) or non-weight bearing (such as when the patient is recumbent).

BACKGROUND

In imaging, and in particular in medical imaging, misalignment of portions of a subject being imaged (or equivalently of images of such portions) can occur for several reasons. For example, the subject may move over the course of a scan (e.g. CT or MRI scanning), such that one portion of the subject (such as the portion imagined first) is misaligned with another (such as the portion imagined towards the end of the scan). This problem is especially pronounced when the scan is protracted, such as when a large portion of a patient's body (e.g., covering the entire body from hip to ankle) is scanned.

Misalignment can also occur when the region or body part(s) to be scanned require multiple individual scans, should the patient or scanner move between scans. For example, some surgery requires a full lower limb measurement including angle and distance measurements between hip, knee and ankle. Scanning the full region from the patient's hip to the ankle using conventional CT exposes the patient to a large radiation dose. Consequently, one existing approach separately images regions of a patient. For example, according to the MAKO imaging protocol, a Stryker (trade mark) robotic-arm assisted surgery system, a hip to ankle scan does not image the entire region from hip to ankle; instead, the hip, knee, and ankle are scanned separately as three distinct regions. Radiation dose is reduced, but at the expense of increased risk of scan misalignment.

SUMMARY

It is an object of the present invention to address this problem of scan misalignment.

According to a first aspect of the present invention, therefore, there is provided a method of correcting misalignment of, or of aligning, images of one or more portions of a subject, the images obtained by a two- or three-dimensional medical imaging modality, the method comprising:

in consecutive first and second two- or three-dimensional sub-volume scans, (a) identifying at least one first portion and at least one second portion respectively of at least one common anatomical feature or structure (that is, a feature or structure having at least one portion in the first sub-volume scan and at least one portion in the second sub-volume scan), and/or (b) determining first and second axes of objects (such as anatomical features or structures, or portions thereof) in the first and second sub-volume scans, respectively;

determining, based on the first and second portions of the common anatomical feature or structure, or based on the first and second axes, a transformation (such as in the form of a transformation array, vector or matrix, and such as of the first portion) that aligns or brings into registration the first and second portions (whether to each other or to a common reference frame, such as a matching template comprising, for example, an image or an object mask);

aligning the first and second sub-volume scans by applying the transformation (such as to the first sub-volume scan) and forming aligned first and second sub-volume scans;

generating an aligned image from (such as by combining) the aligned first and second sub-volume scans; and outputting the aligned image (such as by saving, transmitting, displaying or printing the aligned image).

A transformation array may be in the form, for example, of a vector (indicative a translation and/or a rotation) or a matrix (indicative a translation and/or rotation). In some embodiments, a transformation array contains one number only (e.g. a translation in one dimension or a rotation in one dimension).

It should be noted that, as employed herein, "align" and "alignment", etc, of two image portions, features, axes or images, etc, may entail transforming the first to the second or both to a common frame of reference. In addition, it should be understood that, as employed herein, "aligned first and second sub-volume scans" may comprise a transformed first sub-volume scan and an untransformed second sub-volume scan, or a transformed first sub-volume scan and a transformed second sub-volume scan.

The method of this aspect (and of the other aspects disclosed herein, including as implemented by systems according to the invention) may initially involve receiving the inputted image data (which constitute the one or more images) in the form of a plurality of sub-volume scans and reading the images into an image data store. The method may optionally receive associated inputted non-image data and read that data into a non-image data store.

The method (and system described below) may employ a plurality of first portions and/or a plurality of second portions of the common anatomical feature or structure.

In an embodiment, the first and second sub-volume scans include an overlap region that comprises one or more image slices of the first sub-volume scan and respective one or more image slices of the second sub-volume scan that share respective common image slice locations with the one or more image slices of the first sub-volume scan.

In this embodiment, the overlap region may comprise a plurality of sequential image slices of the first sub-volume scan and a respective plurality of sequential image slices of the second sub-volume scan.

In an example, the one or more image slices of the first sub-volume scan include the first portion of the common anatomical structure; the one or more image slices of the second sub-volume scan include the second portion of the common anatomical structure; the first portion and the second portions are identical; and the transformation brings into registration the one or more image slices of the first sub-volume scan and the respective one or more image slices of the second sub-volume scan.

In an embodiment, the method comprises generating respective segmentation mask images of one or more objects (such as objects of interest) or of the portions of the common anatomical structure and constructing a two- or three-dimensional model of the overlap region based on the segmentation mask images.

In an embodiment, the method comprises detecting coordinates of corners, edges and/or boundaries of features or objects in the overlap region.

In an embodiment, the method comprises determining the first and second axes using principal component analysis with segmentation masks or with 3D models of the objects or based on detected features of the objects (e.g. boundaries of the objects in the image).

In an embodiment, the method comprises synthesizing one or more synthetic image slices so as to constitute or augment an overlap region of the first and second sub-volume scans.

In this embodiment, the method may comprise synthesizing the one or more synthetic image slices using one or more deep learning models and/or using interpolation.

In an embodiment, the method comprises:
matching the consecutive first and second sub-volume scans to at least one of one or more templates (e.g. images or object masks), the one or more templates being historical, typical or idealized representations of at least part of the one or more portions of the subject or objects (e.g. structures or materials) therein; and
determining, based on the at least one matching template, a transformation (such as of the first sub-volume scan) that aligns or brings into registration the first and second sub-volume scans (whether to each other or to a common reference frame, such as a matching template);
aligning the first and second sub-volume scans by applying the transformation (such as to the first sub-volume scan) and forming aligned first and second sub-volume scans (aligned to each other or to a common reference frame); and
generating a further aligned image by combining the aligned first and second sub-volume scans.

Note that the determining and aligning steps may be performed concurrently.

The matching process of this and other aspects and embodiments may involve—for example—image matching, or matching the metadata associated with the scans and with the templates (indicative of, for example, the imaged anatomical region, imaging modality and imaging parameters), or a combination of both.

The templates in this and the other aspects and embodiments disclosed herein may comprise two- or three-dimensional images, two-dimensional image masks, or three-dimensional models of the relevant anatomical region or of object(s) typically found in the relevant anatomical region (e.g. anatomical structures and materials) and generated—for example—by segmentation from such two- or three-dimensional images. In all such cases, a template may be a historical, typical or synthesized (e.g. an averaged 3D template created by combining the 3D models of objects from a set of images) image of the imaged region, or otherwise representative of the imaged region, showing the anatomical structures and materials typical of the region captured in the two consecutive scan images.

According a second aspect of the invention, there is also provided a method of correcting misalignment of, or of aligning, images of one or more portions of a subject, the images obtained by a two- or three-dimensional medical imaging modality, the method comprising:
matching the consecutive first and second sub-volume scans to at least one of one or more templates (e.g. images or object masks), the one or more templates being historical, typical or idealized representations of at least part of the one or more portions of the subject or objects (e.g. structures or materials) therein; and
determining, based on the at least one matching template, a transformation (such as of the first sub-volume scan) that aligns or brings into registration the first and second sub-volume scans (whether to each other or to a common reference frame, such as a matching template);
aligning the first and second sub-volume scans by applying the transformation (such as to the first sub-volume scan) and forming aligned first and second sub-volume scans (aligned to each other or to a common reference frame); and
generating an aligned image from (such as by combining) the aligned first and second sub-volume scans (aligned to each other or to a common reference frame); and
outputting the aligned image (such as by saving, transmitting, displaying or printing the aligned image).

Note that the determining and aligning steps may be performed concurrently.

This image alignment approach involves aligning the two consecutive scan images without use of explicit features/axes, so it may be employed when insufficient explicit features or axes can be or have been extracted from the scans, or to supplement the feature/axis alignment approach (es), or to minimize computing time.

It should be noted that the optional features of the first aspect may be employed, mutatis mutandis, with this second aspect.

According a third aspect of the invention, there is also provided a method of correcting misalignment of, or of aligning, images of one or more portions of a subject, the images obtained by a two- or three-dimensional medical imaging modality, the method comprising:
electronically transmitting the images to one or more remote computing devices; and
electronically receiving an aligned image comprising at least portions of the images in aligned form from the remote computing devices;
wherein the aligned image is generated by the remote computing devices by at least:
(i) in consecutive first and second two- or three-dimensional sub-volume scans, (a) identifying at least one first portion and at least one second portion respectively of a common anatomical feature or structure, and/or (b) determining first and second axes of objects (such as anatomical features or structures, or portions thereof) in the first and second sub-volume scans, respectively; and determining, based on the first and second portions of the common anatomical feature or structure, or based on the first and second axes, a transformation (such as of the first portion) that aligns or brings into registration the first and second portions (whether to each other or to a common reference frame, such as a matching template); and/or (ii) matching consecutive first and second sub-volume scans to at least one of one or more templates (e.g. images or object masks), the one or more templates being historical, typical or idealized representations of at least part of the one or more portions of the subject or objects (e.g. structures or materials) therein, and determining, based on the at least one matching template, a transformation (such as of the first sub-volume scan) that aligns or brings into registration the first and second sub-volume scans (whether to each other or to a common reference frame, such as a matching template);
(ii) aligning the first and second sub-volume scans by applying the transformation (such as to the first sub-volume scan) and forming aligned first and second sub-volume scans; and
(iii) generating an aligned image from (such as by combining) the aligned first and second sub-volume scans.

According to a fourth aspect of the present invention, there is provided an image processing system for correcting misalignment of, or of aligning, images of one or more portions of a subject, the images obtained by a two- or three-dimensional medical imaging modality, the system comprising:
- a feature extractor configured to, in consecutive first and second two- or three-dimensional sub-volume scans, (a) identify at least one first portion and at least one second portion respectively of a common anatomical feature or structure; and/or (b) determine first and second axes of objects (such as anatomical features or structures, or portions thereof) in the first and second sub-volume scans, respectively;
- a transformation generator (e.g. a transformation array generator) configured to determine, based on the first and second portions of the common anatomical feature or structure, or based on the first and second axes, a transformation (such as in the form of a transformation array, vector or matrix, and such as of the first portion) that aligns or brings into registration the first and second portions (whether to each other or to a common reference frame, such as a matching template);
- a sub-volume aligner configured to align the first and second sub-volume scans by applying the transformation (such as to the first sub-volume scan) and forming aligned first and second sub-volume scans; and
- a super-volume generator configured to generate an aligned image from (such as by combining) the aligned first and second sub-volume scans; and
- an output for outputting the aligned image (such as by saving, transmitting, displaying or printing the aligned image).

In an embodiment, when the first and second sub-volume scans include an overlap region that comprises one or more image slices of the first sub-volume scan and respective one or more image slices of the second sub-volume scan that share respective common image slice locations with the one or more image slices of the first sub-volume scan, the one or more image slices of the first sub-volume scan include the first portion of the common anatomical structure, the one or more image slices of the second sub-volume scan include the second portion of the common anatomical structure, and the first portion and the second portions are identical; the transformation generator is configured to generate the transformation of the first portion so as to bring into registration the one or more image slices of the first sub-volume scan and the respective one or more image slices of the second sub-volume scan.

In this embodiment, the overlap region may comprise a plurality of sequential image slices of the first sub-volume scan and a respective plurality of sequential image slices of the second sub-volume scan.

In an embodiment, the system comprises a segmenter configured to generate respective segmentation mask images of one or more objects of interest or of the portions of the common anatomical structure, and a two- or three-dimensional model configured to construct a two- or three-dimensional model of the overlap region based on the segmentation mask images.

In an embodiment, the system comprises an image feature detector configured to detect coordinates of corners, edges and/or boundaries of features or objects in the overlap region.

In an embodiment, the system comprises an object axis determiner configured to determine the first and second axes using principal component analysis with segmentation masks or with 3D models of the objects or based on detected features of the objects (e.g. boundaries of the objects in the image).

In an embodiment, the system comprises an overlap region synthesizer configured to synthesize one or more synthetic image slices so as to constitute or augment an overlap region of the first and second sub-volume scans.

In this embodiment, the overlap region synthesizer may be configured to synthesize the one or more synthetic image slices using one or more deep learning models and/or using interpolation.

In an embodiment, the system comprises:
- an image aligner configured to match the consecutive first and second sub-volume scans to at least one of one or more templates (e.g. images or object masks), the one or more templates being historical, typical or idealized representations of at least part of the one or more portions of the subject or objects (e.g. structures or materials) therein;
- wherein the transformation generator is further configured to determine, based on the at least one matching template, a transformation (such as of the first sub-volume scan) that aligns or brings into registration the first and second sub-volume scans;
- the sub-volume aligner is further configured to align the first and second sub-volume scans by applying the transformation (such as to the first sub-volume scan) and form aligned first and second sub-volume scans (aligned to each other or to a common reference frame); and
- the super-volume generator is further configured to generate a further aligned image from (such as by combining) the aligned first and sub-volume scans.

According to a fifth aspect of the present invention, there is provided an image processing system for correcting misalignment of, or of aligning, images of one or more portions of a subject, the images obtained by a two- or three-dimensional medical imaging modality, the system comprising:
- an image aligner configured to match consecutive first and second sub-volume scans to at least one of one or more templates (e.g. images or object masks), the one or more templates being historical, typical or idealized representations of at least part of the one or more portions of the subject or objects (e.g. structures or materials) therein;
- a transformation generator configured to determine, based on the at least one matching template, a transformation (such as of the first sub-volume scan) that aligns or brings into registration the first and second sub-volume scans;
- a sub-volume aligner configured to align the first and second sub-volume scans by applying the transformation (such as to the first sub-volume scan) and form aligned first and second sub-volume scans (aligned to each other or to a common reference frame); and a super-volume generator configured to generate an aligned image by combining the aligned first and second sub-volume scans; and an output for outputting the aligned image (such as by saving, transmitting, displaying or printing the aligned image).

It should be noted that the optional features of the fourth aspect may be employed, mutatis mutandis, with this fifth aspect.

According to a sixth aspect of the present invention, there is provided computer program code (such as a computer program product) comprising instructions configured to implement, when executed by one or more computing devices, the method of the first, second or third aspects.

This aspect also provides a computer-readable medium (which may be non-transitory) comprising such computer program code.

It should be noted that any of the various individual features of each of the above aspects of the invention, and any of the various individual features of the embodiments described herein including in the claims, can be combined subject only to technical viability.

BRIEF DESCRIPTION OF THE DRAWING

In order that the invention may be more clearly ascertained, embodiments will now be described by way of example with reference to the following drawing, in which.

DETAILED DESCRIPTION

Figure 1:
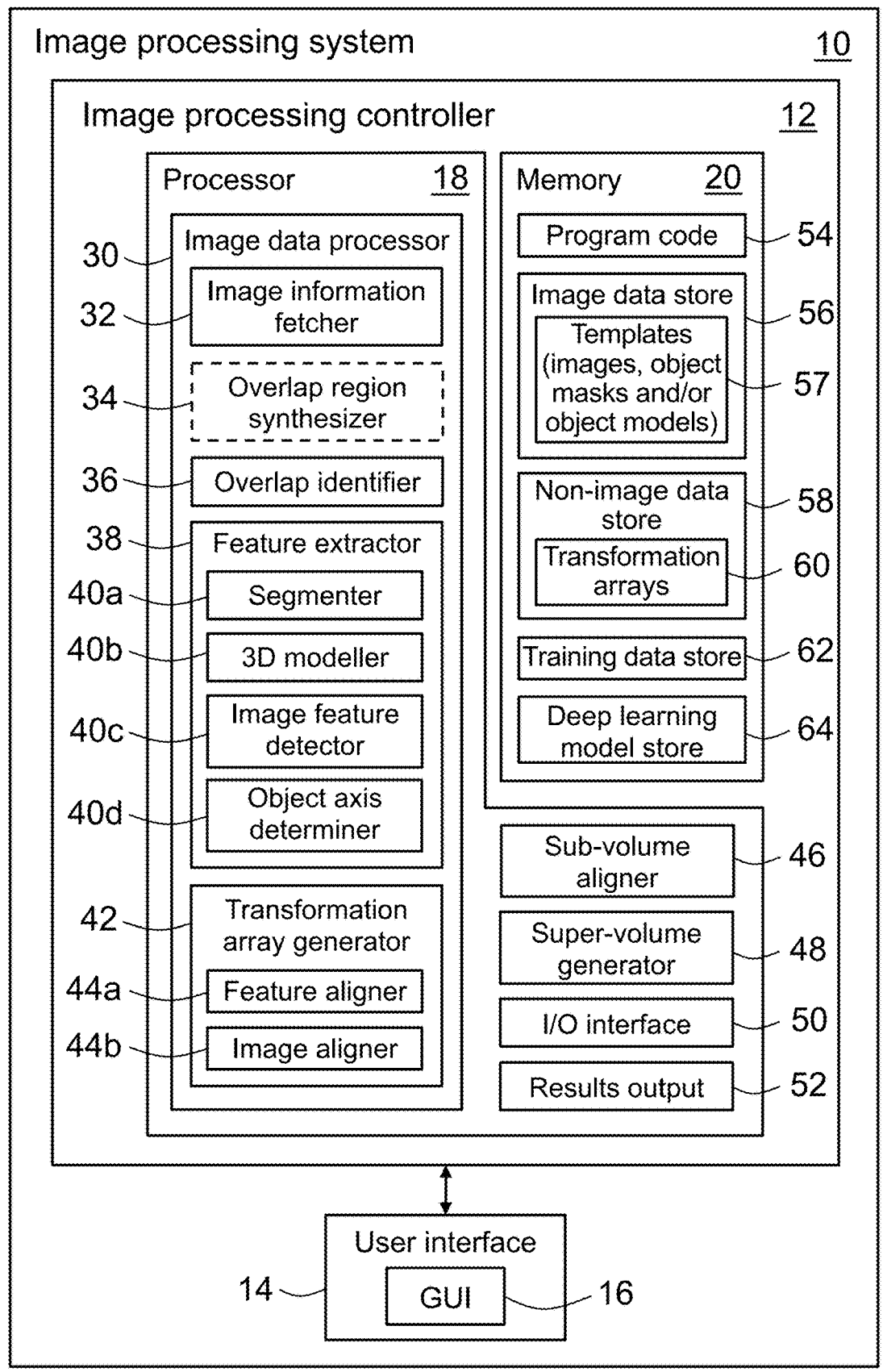
FIG. 1 is a schematic view of an image processing system according to an embodiment of the present invention.

FIG. 1 is a schematic view of an image processing system 10 according to an embodiment of the present invention, of application in particular for processing medical images so as to correct misalignment or to align the images or, equivalently, features in the images.

System 10 includes an image processing controller 12 and a user interface 14 (including a GUI 16). User interface 14 includes one or more displays (on one or more of which may be generated GUI 16), a keyboard and a mouse, and optionally a printer.

Image processing controller 12 includes at least one processor 18 and a memory 20. Instructions and data to control operation of processor 18 are stored in memory 20.

System 10 may be implemented as, for example, a combination of software and hardware (e.g. circuitry) on a computer (such as a server, personal computer or mobile computing device) or as a dedicated image processing system. System may optionally be distributed; for example, some or all the components of memory 20 may be located remotely from processor 18; user interface 14 may be located remotely from memory 20 and/or from processor 18 and, indeed, may comprise a web browser or a mobile device application.

Memory 20 is in data communication with processor 18, and typically comprises both volatile and non-volatile memory (and may include more than one type of memory), including RAM (Random Access Memory), ROM (Read Only Memory) and one or more mass storage devices.

As is discussed in greater detail below, processor 18 includes an image data processor 30, an I/O (Input/Output) interface 50 and an output in the form of a results output 52. Image data processor 30 includes an image information fetcher 32, an optional overlap region synthesizer 34, an overlap identifier 36 and a feature extractor 38. Feature extractor 38 includes a segmenter 40$a$ configured to generate segmentation mask images, a 3D modeller 40$b$ for constructing 3D models of objects of interest segmented by segmenter 40$a$, and an image feature detector 40$c$ for detecting features (such as external shape characteristics) of objects in an image. Image feature detector 40$c$ may implement, for example, Harris corner detection and generate point clouds from detected corners of objects of interest, and/or boundary detection involving detecting and localising the boundary of an object of interest by differentiating between light and dark pixels.

Image data processor 30 further includes a transformation generator in the form of a transformation array generator 42 (which includes a feature aligner 44$a$ and an image aligner 44$b$), a sub-volume aligner 46, and a super-volume generator 48. Transformation array generator 42 is configured to generate one or more transformation arrays for transforming sub-volume scans into a desired space, which involves controlling feature aligner 44$a$ to align—or to determine the calculation required to align—respective distinctive features in pairs of consecutive sub-volume scans, and/or controlling image aligner 44$b$ to align—or to determine the calculation required to align—respective pairs of consecutive sub-volume scans based on the entirety or substantial entirety of the respective images. A transformation array may be in the form, for example, of a vector (indicative a translation and/or a rotation) or a matrix (indicative a translation and/or rotation). In some other embodiments, a transformation array contains one number only (e.g. a translation in one dimension or a rotation in one dimension).

A sub-volume scan is a scan that includes only one or more parts (or portions of a part) of the body of a patient (e.g. a scan of a limb, of the hips and femur, or a scan of the hips only), which it is desired be aligned or combined in suitably aligned form. Each sub-volume scan includes one or more two-dimensional (2D) image slices.

Sub-volume aligner 46 is configured to align the sub-volume scans, while super-volume generator 48 generates an image that combines the sub-volume scans in correct alignment.

Sub-volume aligner 46 and super-volume generator 48 refer to 'volumes' because the scans generally comprise three-dimensional (3D) images, so are scans of a 3D volume. However, it should be appreciated that system 10 of this embodiment may also be applied to 2D images, in which case a volume is two-dimensional and the slices of such a volume are two dimensional strips, and a sub-volume scan of a 2D image is thus one or more such strips.

Memory 20 includes program code 54, an image data store 56, a non-image data store 58, a training data store 66, and a deep learning model store 64. Image processing controller is implemented, at least in part, by processor 18 executing program code 54 from memory 20.

In broad terms, the I/O interface 50 is configured to read or receive input data in the form of image data (referred to as 'image input data') and non-image data (referred to as 'non-image input data'), pertaining to—for example—subjects or patients, into image data store 56 and non-image data store 58 of memory 20, respectively, for processing. The image input data stored in image data store 56 is in a format that contains metadata, such as DICOM. The non-image input data, if any, stored in non-image data store 58 can comprise a broad range of information and information types, such as the desired body laterality to align the sub-volume scans and the desired method to perform image registration, and is accessible by processor 18 (and in particular image data processor 30) for use in super-volume scan generation.

Image information fetcher 32 retrieves the image data (constituting one or more images) and metadata stored in input image store 56, the latter including, for example, patient information and imaging apparatus (e.g. CT or MRI scanner) parameters associated with the collection of the image data. Feature extractor 38 extracts features in the scan image(s) or of the object(s) of interest (which may be one or more tissues), such as bone and muscle in the scan images, from the input image data by extracting distinctive features. Features may be the information about the 2D and/or 3D shape of the objects in the image, or may be information about the 2D and/or 3D location of the objects in the image, or may be information about the 2D and/or 3D texture of the objects in the image. In this embodiment, feature extractor 38 uses segmenter 40*a* and the pre-trained deep learning model(s) stored in deep learning model store 64 to generate segmentation mask images of the bone and/or muscle, and/or any other objects of interest. Feature extractor 38 then uses 3D modeller 40*b* to generate a 3D model of the objects of interest based on the segmentation masks. The 3D models comprise, for example, point clouds or a 3D mesh, but any other 3D data format that can represent the shapes and locations of the objects of interest may be employed.

In another embodiment, feature extractor 38 controls image feature detector 40*c* to perform image feature detection using one or more feature extraction algorithms (such as Harris corner detection or boundary detection) and thereby detect image features such as edges, corners, blobs, and ridges of the objects of interest in the image. In still another embodiment, feature extractor 38 uses object axis determiner 40*d* to calculate the 3D axis of the objects. The axes can be calculated using principal component analysis with the segmentation masks or the 3D models of the objects or, alternatively, the axes can be calculated based on the detected features, such as boundaries of the objects in the image.

It should be noted that, in each embodiment, feature extractor 38 may be applied to all of the slices of a respective sub-volume, or to only one or more of its slices, with the features thereby extracted being used for sub-volume alignment purposes (as described below). That is, the alignment of sub-volumes can be based on all of the extractable features in the sub-volume, but it may be sufficient to rely on a subset of the extractable features. A subset of features may be employed to reduce computing time, or to limit the processing to employ only the more reliably extractable features. In the latter example, a user configurable threshold may be employed by system 10, indicative of a minimum reliability of feature extraction.

Transformation array generator 42 calculates one or more transformation arrays by controlling feature aligner 44*a* to align the features extracted by feature extractor 38. In this embodiment, feature aligner 44*a* aligns the 3D points of the 3D models of objects in the sub-volume scans, and transformation array generator 42 then determines the transformation array between the sub-volume scans that will effect that alignment. In another embodiment, feature aligner 44*a* aligns the 3D or 2D image features (edges, blobs, or ridges) of objects in the sub-volume scans, and transformation array generator 42 then determines the transformation array between the sub-volume scans that will effect that alignment.

In another embodiment, feature aligner 44*a* aligns the axes of objects in the sub-volume scans and transformation array generator 42 then determines the transformation array between the axes (and hence sub-volume scans) that will effect that alignment (i.e. whether there is overlap or no overlap between the sub-volume scans).

In still another embodiment, transformation array generator 42 controls image aligner 44*b* to align the scan images without relying on extracted, specific features or axes, but instead by determining a correlation between the two consecutive scan images in their entirety or substantially their entirety. That is, image aligner 44*b* aligns the two consecutive scan images by determining the correlation between the two scans or matching one of the two scans to the other scan. This is done using template matching, in which each of the two scans is matched to a template in a library of such templates 57 (stored in image data store 56). Each of templates 57 is a two- or three-dimensional image, a two-dimensional image mask, or a three-dimensional model of an object or objects (e.g. anatomical structures and materials) typically found in the relevant anatomical region and generated—for example—by segmentation. In all such cases, a template may be a historical, typical or synthesized (e.g. an averaged 3D template created by combining the 3D models of objects from a set of images) image of the imaged region, or otherwise representative of the imaged region, showing the anatomical structures and materials typical of the region captured in the two consecutive scan images.

Image aligner 44*b* finds an acceptable match or the best match between the two consecutive scan images and at least one of the templates; the matching template(s) provide a reference frame to which the two consecutive scan images can be compared. Transformation array generator 42 then uses that reference frame to determine the transformation array between the two consecutive scan images that will effect their alignment.

This image alignment approach, in which the two consecutive scan images are aligned without use of explicit features or axes, is employed when insufficient explicit features or axes can be or have been extracted from or identified in the scans. In addition, however, it may be employed to supplement the feature/axis alignment approach(es) or to minimize computing time. Transformation array generator 42 may be configured, for example, to control image aligner 44*b* to align the scan images in this manner if system 10 is controlled to minimize computing time, or in response to failing to extract sufficient features/ axes, or by default.

A transformation array may be a vector or a matrix (in each example indicative of a translation and/or a rotation). In some other embodiments, a transformation array contains one number only (e.g. indicative of a translation or a rotation in one dimension). The transformation array defines the translation and/or rotation in 2D or 3D that a sub-volume scan should be transformed to align with the other sub-volume scan.

Sub-volume aligner 46 uses the transformation array from transformation array generator 42 to transform the space of each corresponding sub-volume scan into a desired space in order to align the sub-volume scans. Super-volume generator 48 converts the super-volume to a desired format, such as DICOM, and stores corresponding metadata into the designated files. I/O interface 50 outputs the results of the processing to, for example, results output 52 and/or to GUI 16.

Thus, referring to FIG. 1, system 10 is configured to receive two types of data pertaining to a subject or patient: image input data and non-image input data. The image input data is in the form of a plurality of sub-volume CT scans comprising 3-dimensional (3D) images of different parts of the patient's body. Each CT scan is stored in a format, such as DICOM, that includes metadata as discussed above. The non-image input data includes information about the name of the body part corresponding to a respective sub-volume scan, the laterality of interest (i.e. which side of the body is being examined), and information about the desired transformation array calculation method, such as the number of sampling points for image registration.

In addition, system 10 generates intermediate results obtained during execution, which includes image data and non-image data. Image data includes the final super-volume scan and intermediate image data such as single slice images of the input 3D scan, segmentation images of a single object or multiple objects, 3D models for a single object or multiple objects, and synthetic 2D or 3D images for the corresponding 2D or 3D images with missing pixels or slices. The object of interest might be a portion of a human or non-human body, such as bone and muscle, or of external objects such as a calibration object. Non-image output data includes the calculated transformation arrays, configuration files, and logging files of the program. System 10 stores image data and non-image data in the image data store 56 and non-image data store 58, respectively.

As mentioned above, image data processor 30 includes six principal components: image information fetcher 32, overlap identifier 36, feature extractor 38, transformation array generator 42, sub-volume aligner 46 and super-volume generator 48. The image data and non-image data are received by image data processor 30 from memory 20. Based on the image characteristics (such as image quality and image resolution), and object characteristics (such as anatomical structure(s) and the position of the object of interest in the image data), feature extractor 36 determines which features will be extracted from the scan.

In this embodiment, feature extractor 38 extracts the external shape information of the object(s) of interest. Feature extractor 38 uses segmenter 40a and the pre-trained deep learning model(s) stored in deep learning model store 64 to generate segmentation mask images of the bone and/or muscle (and/or any other objects of interest). Feature extractor 38 then controls 3D modeller 40b to generate 3D models of the objects of interest based on the segmentation masks.

The 3D models are point clouds or 3D meshes (or other 3D data formats) that represent the external shapes of the objects of interest.

In another embodiment, feature extractor 38 extracts the location information of the object(s) of interest. Feature extractor 38 controls object axis determiner 40d to calculate the 3D axes of the objects. The axes may be calculated using principal component analysis with the segmentation masks or the 3D models of the objects, or the axes may be calculated based the detected features, such as the boundaries of the objects in the image. The axes can be calculated from the objects of interest when there is overlap or no overlap between the scans.

In another embodiment, feature extractor 38 determines texture or other features of the objects of interest, such as by controlling image feature detector 40c to detect images features such as edges, corners, blobs, and ridges of the objects of interest in the image.

In this embodiment, the extracted features serve as inputs to transformation array generator 42 to generate the transformation array. Based on the extracted features—with or without other information such as the body laterality selection—and the desired image registration method indicated by non-image input data in non-image data store 58, transformation array generator 42 generates one or more transformation arrays, which are then used by sub-volume aligner 46 to align object(s) of interest in the sub-volumes.

In another embodiment, transformation array generator 42 controls feature aligner 44a to align the scan images directly without extracting any features to calculate a transformation array. For example, feature aligner 44a may align two scan images by calculating the correlation between the two scans or matching one of those scans to the other using a template matching based approach.

Feature extractor 38 selects models from deep learning models 64 that are pre-trained using data from training data store 66. Training data store 66 contains data to train one or more deep learning models, which includes labels or annotations that constitute the ground truth for specific machine learning tasks. The training data is prepared so as to be suitable for training one or more deep-learning models that aim to perform segmentation for a single object or multiple objects, or to generate images for the missing slices or images for the slices with missing pixels. The training data consists of individual 2D images and/or 3D images (essentially a series of sequential 2D images) of a single object or multiple objects. The labels indicate the region of a single object or multiple objects. The training data can be in the form of real clinical data, real phantom data, simulated data, or a mixture of two or more of these.

The transformation array information and the aligned super-volume is output to user interface 14 via results output 52 and I/O interface 50.

Figure 2A:
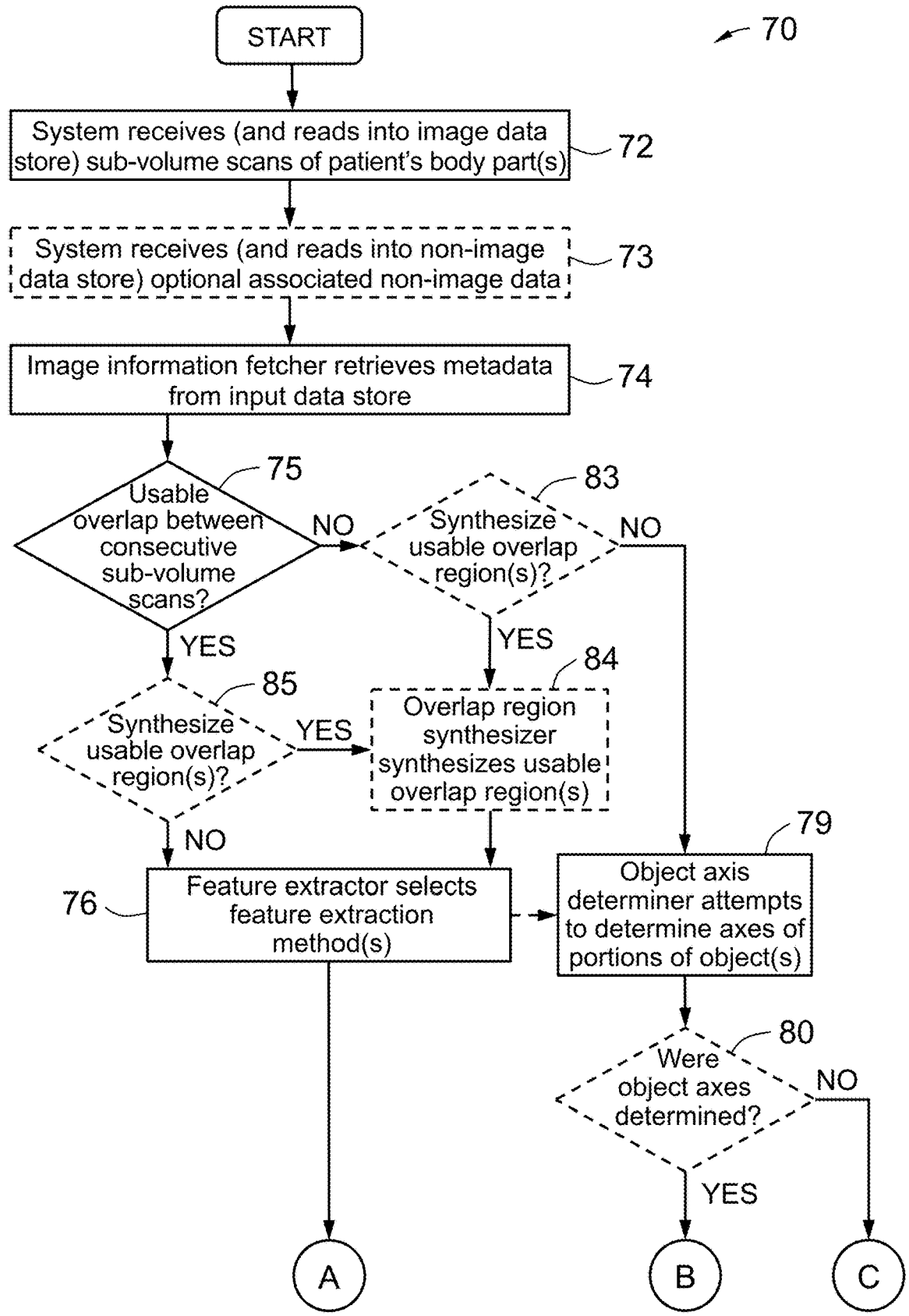
FIGS. 2A and 2B depict a schematic flow diagram of the general workflow of the image processing system of FIG. 1 according to an embodiment of the present invention.
Figure 2B:
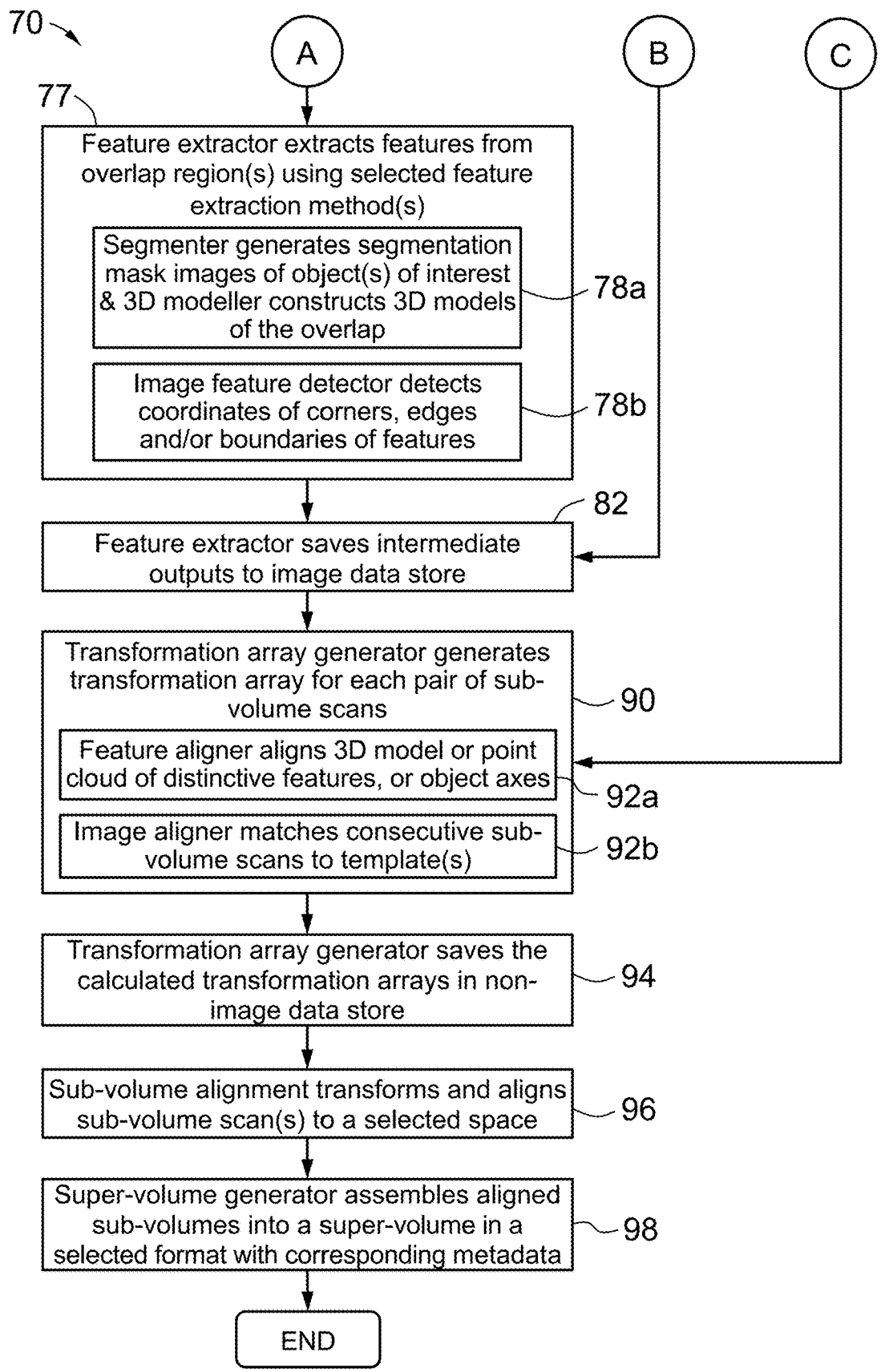

FIGS. 2A and 2B provide a flow diagram 70 of the general workflow of system 10 of FIG. 1. Referring to FIGS. 2A and 2B, at step 72 system 10 receives inputted image data in the form of a plurality of sub-volume scans and reads the images into image data store 56. At optional step 73, system 10 receives (optional) associated inputted non-image data and reads that data into non-image data store 58.

Memory 20 is advantageously configured to allow high-speed access of data by processor 18. For example, if system 10 is implemented as a combination of software and hardware on a computer, the images are desirably read into RAM of memory 20.

At step 74, image information fetcher 32 retrieves from image data store 56 metadata associated with each of the input sub-volume scans, including information indicative of the imaging modality and patient and/or object information. Multiple check mechanisms are implemented at step 74 to check the validity of the received scan data, so as to verify the scan data against the metadata information and/or the non-image data. This includes checking whether there are any missing sub-volume scans or missing slices within a sub-volume scan. It also includes the validation of all sub-volume scans coming from the same study and having similar frames of reference. The resolutions of the sub-volume scans is checked for uniformity; if found not to be of uniform resolution, at least some of the scans are resized to a common resolution.

At step 75, overlap identifier 36 determines, from the attributes retrieved in step 74 from image data store 56, whether there is any usable overlap between one or more pairs of consecutive sub-volume scans. The overlap between a pair of consecutive sub-volume scans is defined as a single image slice or a plurality of sequential image slices in one sub-volume scan that share a common image slice location with a single image slice or share respective common image slice locations of a plurality of sequential image slices in another sub-volume scan. That is, within the overlap between first and second consecutive sub-volume scans of such a pair, one or more image slices in the first sub-volume scan share locations with respective one or more image slices in the second sub-volume scan. Furthermore, the overlap is usable if useful features can be extracted from the image slices in the overlap. Useful features are features that can be used (i.e. are usable) to align the sub-volume scans. However, image(s) in the overlap can contain one or more types of CT artefacts that cause difficulties for the program to extract useful features. Examples of different types of CT artefacts are noise, motion artefacts, metal artefacts, ring artefacts, and cone beam artefacts. The CT artefacts can introduce include blurriness, double images, bright streaks, dark streaks, and obscured boundaries between anatomical structures, all of which can contribute to alignment inaccuracy. As a result, image(s) that are affected by CT artefacts to so great an extent that useful features cannot be detected are not usable, so are discarded from the feature extraction.

If, at step 75, overlap identifier 36 identifies one or more usable overlaps, processing continues at step 76, where feature extractor 38 selects one or more suitable feature extraction methods for extracting features from the overlap(s).

The choice of feature extraction method depends on whether usable overlap exists between pair(s) of sub-volume scans and, if there is usable overlap, on the extent of the overlap(s). The input image data contains a plurality of sub-volume scans, so there are three possible usable overlap scenarios: (i) all pairs of consecutive or adjacent sub-volume scans have usable overlap, (ii) no pairs of consecutive sub-volume scans have usable overlap, and (iii) some pairs of consecutive sub-volume scans have usable overlap and some pairs of consecutive sub-volume scans do not have usable overlap. One or more feature extraction methods are used during image processing for each pair of consecutive sub-volume scans, according to the prevailing scenario.

Thus, at step 76—there being usable overlap between one or more pairs of consecutive sub-volume scans (viz. scenarios (i) and (iii))—feature extractor 38 selects segmentation and/or feature detection. Processing then continues at step 77 of FIG. 2B (described below).

As an alternative, however, feature extractor 38 may optionally—at step 76—select object axis determination and pass processing to step 79, even though object axis determination is more generally employed when no usable overlap regions exist. At step 79, feature extractor 38 controls object axis determiner 40*d* to attempt to determine the 3D axes of objects (e.g. anatomical features or structures, or portions thereof) in the overlap region. The axes may be determined using, for example, principal component analysis with segmentation masks (generated as described above with segmenter 40*a*) or the 3D models of the objects (generated as described above with segmenter 40*a* and 3D modeller 40*b*), or based on the detected features (e.g. boundaries of the objects in the image, detected as described above with image feature detector 40*c*), as described in greater detail below by reference to FIG. 5.

In this alternative, processing then passes to step 80, where feature extractor 38 checks whether object axis determiner 40*d* successfully determined object axes at step 79. If so, processing passes to step 82 of FIG. 2B (described below). If object axis determiner 40*d* was unsuccessful in determining object axes, processing continues at step 90 of FIG. 2B (described below).

At step 77 of FIG. 2B, if feature extractor 38 selected segmentation, feature extractor 38 implements segmentation method 78*a*. This method 78*a* involves controlling segmenter 40*a* to select and employ one or more deep learning models and perform single object or multiple objects segmentation therewith, and to generate segmentation mask images. Feature extractor 38 then controls 3D modeller 40*b* to construct 3D models of the overlap for each sub-volume scan from those segmentation mask images, as described in greater detail below by reference to FIG. 3.

Alternatively, if feature extractor 38 selected feature detection, feature extractor 38 implements feature detection method 78*b*, in which feature extractor 38 controls image feature detector 40*c*, which employs image texture detection, to detect the coordinates of corners, edges and/or boundaries of distinctive or identifiable features-corresponding to one or more objects—in the respective overlap regions. Feature extractor 38 outputs the detected set of coordinates of the distinctive features in each overlap region, which form a point cloud of these distinctive features in the overlap region—as described in greater detail below by reference to FIG. 4.

Processing then continues at step 82.

It should be understood that two or more of these methods (segmentation, feature detection and object axis determination) may be employed in combination, whether to augment the accuracy of alignment or as a cross-check of the techniques' respective results.

Thus, whether following step 77 or 80, processing continues at step 82, where feature extractor 38 saves intermediate outputs, including the segmentation mask images, 3D models, distinctive features, object axes, and any synthetic overlap regions (discussed below), to image data store 56.

Processing then continues at step 90.

If, at step 75, overlap identifier 36 identifies no usable overlaps, processing continues at step 79 where, as described above, feature extractor 38 controls object axis determiner 40*d* to attempt to determine the 3D axes of portions of the object(s). The axes may be calculated using principal component analysis with the segmentation masks or the 3D models of the objects, or based on detected features (such as boundaries of the objects from the image).

Processing then continues at step 80 (see above).

Optionally, in usable overlap scenarios (ii) and (iii) above, system 10 may employ optional overlap region synthesizer 34, which uses one or more deep learning models or interpolation to synthesize one or more missing usable overlap regions between one or more pairs of sub-volume scans. This can be triggered manually by a user input (such as by system 10 requesting that the user indicate whether system 10 should employ synthetic overlap regions), or automatically according to pre-selected user-controllable parameters, such as by system 10 being provided with a parameter that indicates whether system 10 should employ synthetic overlap regions.

For example, if at step 75 overlap identifier 36 identifies no usable overlaps, processing may continue at optional step 83 instead of passing automatically to step 79. At optional step 83, system 10 determines whether it has been controlled or configured to synthesize usable overlap regions should none have been be identified at step 75; if not, processing continues at step 79. However, if system 10 determines that it has been controlled or configured to synthesize usable overlap regions should none be identified, processing continues at optional step 84, where optional overlap region synthesizer 34 synthesizes one or more synthetic usable overlap regions (described further below by reference to FIG. 6). Overlap region synthesizer 34 may synthesize the whole image or only the objects in the image, and can synthesize some or all of the details of the objects, such as only shape or shape and texture.

Processing then continues at step 76 as described above. In cases in which overlap region synthesizer 34 synthesizes usable overlap regions (at step 84), feature extractor 38—at step 77—may use one or more of the methods 78a, 78b discussed above to extract features from the synthetic overlap regions.

Similarly, if at step 75, overlap identifier 36 identifies usable overlaps between some but not all pairs of sub-volume scans, processing may continue at optional step 85 instead of passing to step 76. At optional step 85, system 10 determines whether it has been controlled or configured to synthesize missing usable overlap regions; if not, processing continues at step 76.

However, if system 10 determines that it has been controlled or configured to generate missing usable overlap regions, processing continues at optional step 84, where optional overlap region synthesizer 34 synthesizes one or more synthetic usable overlap regions. Processing the continues at step 76 as described above.

At step 90, for each pair of 3D models or point clouds of distinctive features generated in step 77 in the overlap regions, or object axes determined in step 79, transformation array generator 42 performs image registration to generate one or more transformation arrays; image registration involves transforming scans by translation and/or rotation in 2D or 3D space until the extracted features or object axes from the overlap region of a pair of scans are best matched, thereby obtaining the transformation array. Transformation array generator 42 performs image registration by controlling feature aligner 44a to align (or to determine the calculation required to align) at step 92a a 3D model or a point cloud of the respective distinctive features, or the axes of portions of objects, of the overlap of one sub-volume scan (the 'transformed scan') and a 3D model or a point cloud of distinctive features, or the axes of the other portions of objects, of the other sub-volume scan of the overlap (the 'reference scan'), or to align.

If, however, 3D models or point clouds of distinctive features were not generated and object axes were not determined, transformation array generator 42 performs image registration by controlling image aligner 44b to match—at step 92b—the scan images to at least one of templates 57. The matching template or templates provide one or more common reference frames for the two scan images, for use by transformation array generator 42 when subsequently generating transformation arrays. In this embodiment, image aligner 44b determines the correlation between the two scans images using this template matching based approach.

Whether proceeding via step 92a or 92b (or both, if plural techniques are employed), transformation array generator 42 then generates each transformation array as a representation of the calculation required to transform the transformed scan into the reference scan.

Several check mechanisms are implemented to confirm the validity of the transformation array. In one embodiment, rotation angles are retrieved from the transformation array. If the rotation angles are larger than the pre-determined values, the transformation array is deemed to be incorrect. In another embodiment, for each pair of 3D models or point clouds of distinctive features with a transformation array, at least one of the 3D models or point clouds of distinctive features is transformed.

At step 94, transformation array generator 42 saves the calculated transformation arrays 60 in non-image data store 58.

At step 96, sub-volume aligner 46 transforms each sub-volume scan into a desired/selected space using the corresponding transformation array or arrays.

At step 98, super-volume generator 48 assembles the aligned sub-volumes into a super-volume (itself therefore aligned) in a selected format e.g., DICOM, adds the corresponding metadata to the output image data (e.g. as a DICOM header), and stores the super-volume scan in image data store 56 (and optionally displays the super-volume scan to the user on GUI 16).

Processing then ends.

It should be noted that alignment of the image without the use of explicit features or object axes may be desired for reasons other than the lack of sufficient identifiable features or object axes-such as for processing speed. In such cases, system 10 can be controlled to follow step 74 with step 90, and employ step 92b.

Figure 3:
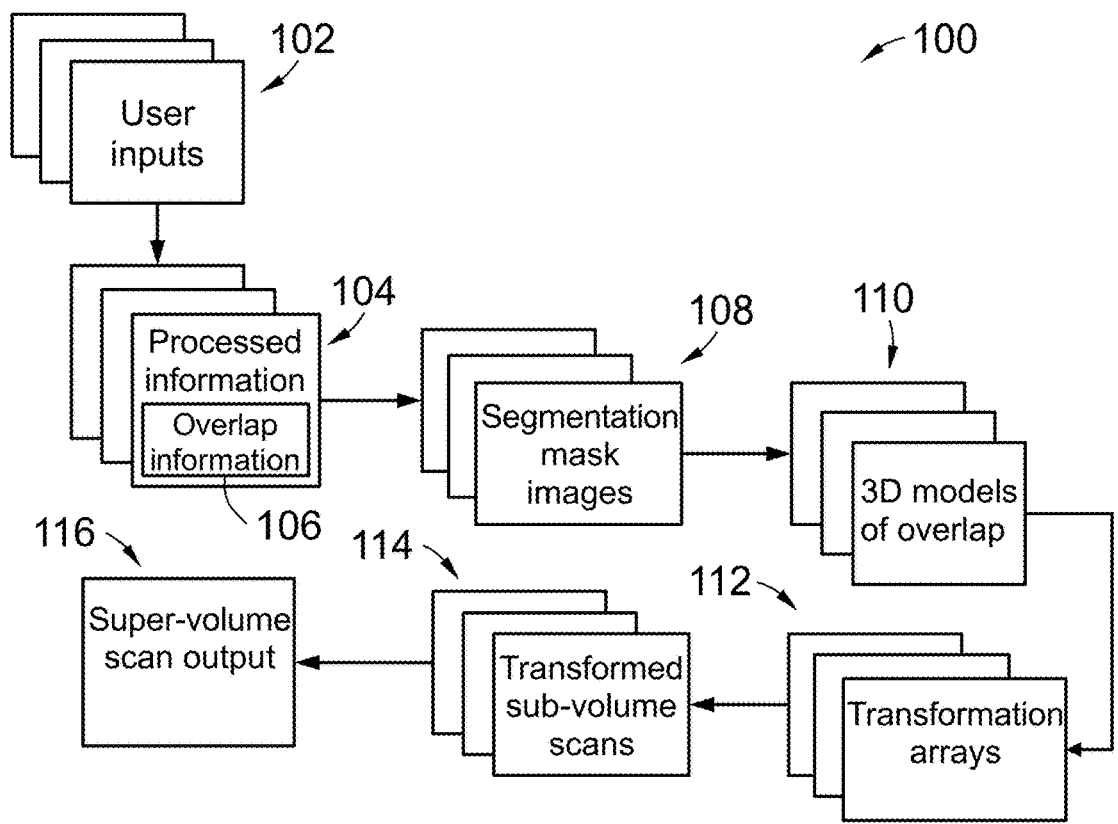
FIG. 3 is a schematic view of a workflow of correcting scan misalignment using segmentation according to an embodiment of the present invention.

FIG. 3 is a schematic workflow 100 of a method of correcting scan misalignment or effecting alignment by matching the shapes of object(s) of interest in the overlapped regions of consecutive sub-volume scans using segmentation, as implemented by system 10.

Image and non-image user inputs 102 are received as shown in FIG. 2A at steps 72 and 73. Processed information 104 (including overlap information 106) is fetched as shown in FIG. 2A at step 74. This embodiment relates to both the scenarios in which overlap information 106 indicates that usable overlap exists between at least some pairs of consecutive sub-volume scans (including if optional overlap region synthesizer 34 synthesizes synthetic overlap regions should too few or no usable overlap regions have been identified).

For each sub-volume scan in each pair of consecutive sub-volume scans with usable overlap (real or synthesized), segmenter 40a employs one or more of the pre-trained deep learning segmentation models stored in deep learning model store 64 to generate segmentation mask images 108 of an object(s) of interest. The images that are subjected to segmentation can be individual 2D images or 3D volumes of the sequential 2D images extracted from the input sub-volume scan, or a combination of both. In one example, the object of interest is from a human or animal body, such as bone and muscle. In another example, the object of interest is a foreign object, such as a prosthetic device or a support for a patient during a CT scan. The foreign object may be, for example, a calibration object that has been attached to a patient's leg(s) to minimize motion artefacts. The object of interest in segmentation mask images 108 can include one or more objects or a combination of objects. That is, the object of interest can be only the bone, muscle and/or a foreign object, or a combination of two or more of such objects.

Segmenter 40a can employ the segmentation model to generate segmentation mask images for all slices of a sub-volume scan, or for only a subset of the slices of a sub-volume scan to reduce computation time.

For each sub-volume scan in the pair of consecutive sub-volume scans, one or more 3D models of the overlap 110 are then constructed based on the generated segmentation mask images 108. Depending on the body laterality from the user inputs received at step 73, there may be a 3D model for the left body only, or a 3D model for the right body only, or—alternatively—a 3D model for the left body and another 3D model for the right body. In the case where the segmentation mask only contains one region, such as the muscle region for the hips or where the left of the body and right of the body cannot be separate, a 3D model for the whole object is constructed.

Construction of the 3D model of the overlap 110 is first initiated by selecting and retrieving those segmentation mask images 108 of slices that belong to the overlap regions between the respective pairs of consecutive sub-volume scans. This is because the overlap represents the part of the images where the object(s) of interest (or portions thereof) in the two consecutive sub-volume scans have the same geometric shape. The coordinates of the object of interest are extracted from the selected segmentation mask images 108 to form two point clouds. Each point cloud corresponds to a 3D model of the overlap 110 generated from a respective one sub-volume scan. Each of the two generated point clouds of the object of interest is converted into a (digital) 3D object, such as a triangle mesh model using surface reconstruction techniques. For each pair of sub-volume scans, there will be at least a pair of 3D models for each laterality of interest. (As discussed above, if the 3D models are constructed without considering laterality, there will generally be only two 3D models.)

For each pair of 3D models of the overlap 110, at least one transformation array is generated as described in FIG. 2B at step 90 using image registration-resulting in one or more transformation arrays 112. The transformed sub-volume scans 114 and the super-volume scan output 116 are generated as illustrated in step 96 and 98 of FIG. 2B respectively.

Figure 4:
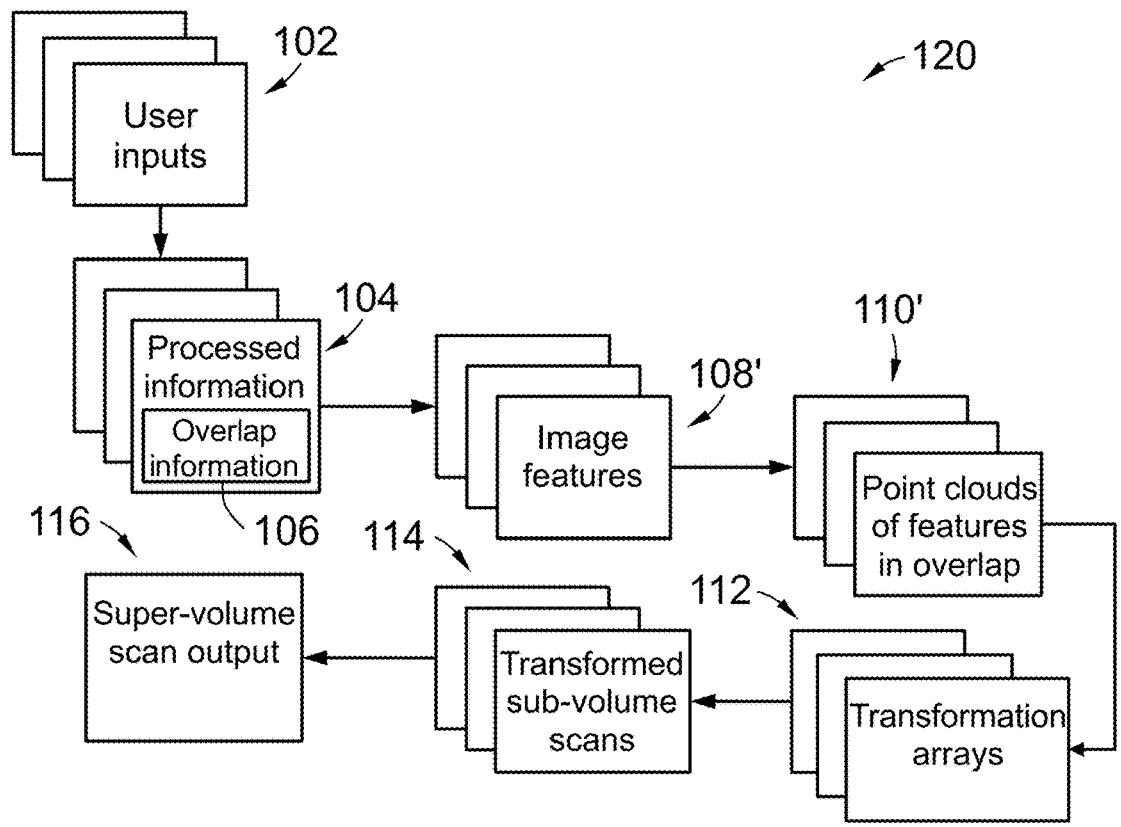
FIG. 4 is a schematic view of a workflow of correcting scan misalignment using image feature detection according to another embodiment of the present invention.

FIG. 4 is a schematic view 120 of a workflow of correcting scan misalignment or effecting alignment by matching image features (rather than segmentation masks) object(s) of interest in the overlap regions of consecutive sub-volume scans using image feature detection, as implemented by system 10.

Image and non-image user inputs 102 are received as illustrated in FIG. 2A at steps 72 and 73. Processed information 104 (including overlap information 106) is fetched as shown in FIG. 2A at step 74. This embodiment relates to both the scenarios in which overlap information 106 indicates that usable overlap exists between at least some pairs of consecutive sub-volume scans (including if optional overlap region synthesizer 34 synthesizes synthetic overlap regions should too few or no usable overlap regions have been identified).

For each sub-volume scan in the pair of sub-volume scans where usable overlap (real or synthesized) exists, feature extractor 38 uses one or more feature extraction algorithms to identify image features 108' of an object of interest. The object of interest is similar to the object of interest described in FIG. 3; it may be—for example—muscle, bone, a calibration object, or any combination of these. Feature extractor 38 may control image feature detector 40c to perform detection of corners, edges, blobs, boundaries, ridges, and/or other formats of texture based features such as SIFT (Scale Invariant Feature Transform), SURF (Speeded Up Robust Features), and HOG (Histogram of Oriented Gradients).

Point clouds of features in the overlap 110 are constructed based on image features 108' extracted from the overlapping slices or regions of the two sub-volume scans. For a pair of sub-volume scans, there will be at least a pair of point clouds for each laterality of interest.

For each pair of point clouds 110' of features in the overlap, transformation array generator 42 generates at least one transformation array, determined as described by reference to step 90 in FIG. 2B, resulting in one or more transformation arrays 112. The transformed sub-volume scans 114 and the final super-volume scan output 116 are generated as described by reference to steps 96 and 98 respectively of FIG. 2B.

Figure 5:
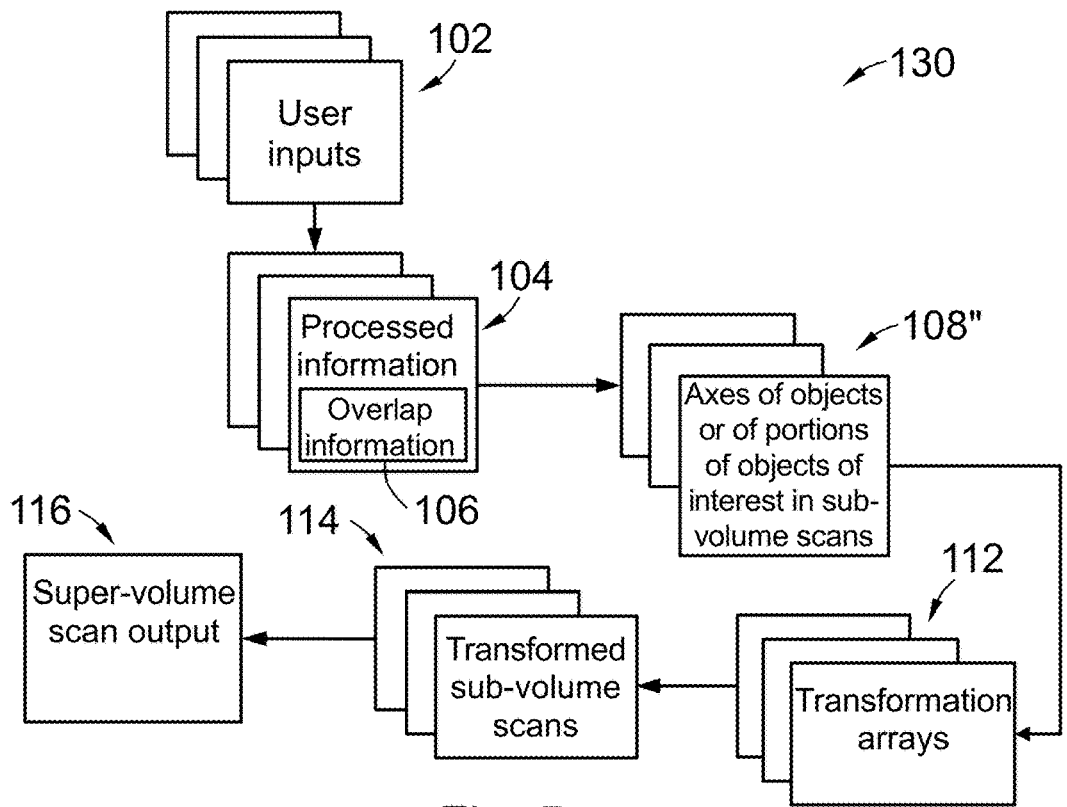
FIG. 5 is a schematic view of a workflow of correcting scan misalignment using object axis determination according to an embodiment of the present invention.

FIG. 5 is a schematic view 130 of a workflow of correcting scan misalignment or effecting alignment if no overlap exists between sub-volume scans or if no usable overlap exists between sub-volume scans according to an embodiment of the present invention (corresponding, for example, to usable overlap scenario (ii) above) using object axis determination, as implemented by system 10.

User inputs 102 are received as illustrated in steps 72 and 73 of FIG. 2A and processed information 104 is fetched as illustrated in step 74 in FIG. 2A. Overlap information 106 is included in processed information 104, so this process is initiated when overlap information 96 indicates that the usable overlap does not exist between a pair of sub-volume scans (which may be simply because no overlap exists between that pair of sub-volume scans).

In order to align the respective two sub-volume scans, feature extractor 38 controls object axis determiner 40d to determine common (or main) axes 108" of objects, or of portions of an object of interest, in consecutive scans. The object of interest may be—for example—muscle, bone, a calibration object, or any combination of these. In this scenario, although there is no overlap, the object—such as tibia bone, fibular bone or an entire leg—spans the two consecutive scans, and the object portions in each of the consecutive scans share the same axis (e.g. major axis). Object axis determiner 40d determines the axis of the object portion in one of the sub-volume scans and the axis of the object portion in the other of the sub-volume scans (or of respective objects—such as materials or structures) known or expected to have axes in parallel). In this embodiment, the axis is determined using PCA (Principal Component Analysis) to obtain the axis of the object portion. The first principal component accounts for the largest possible variance in the pixel/voxel sets of the object in the image.

In another embodiment, the axis is determined by connecting the centre points of the object on the consecutive slices in the z- or depth/longitudinal direction. The centre points may be calculated, for example, as the centroid of the object segmentation masks.

For a pair of sub-volume scans, there will be at least a pair of major axes for each laterality of interest.

For each pair of axes, transformation array generator 42 generates at least one transformation array, determined as described by reference to step 90 in FIG. 2B, resulting in one or more transformation arrays 112. The transformed sub-volume scans 114 and the final super-volume scan output 116 are generated as described by reference to steps 96 and 98 respectively of FIG. 2B.

Workflow 130 may also be used when usable overlap do exist, to supplement one or more other methods for correcting scan misalignment or effecting alignment.

Figure 6:
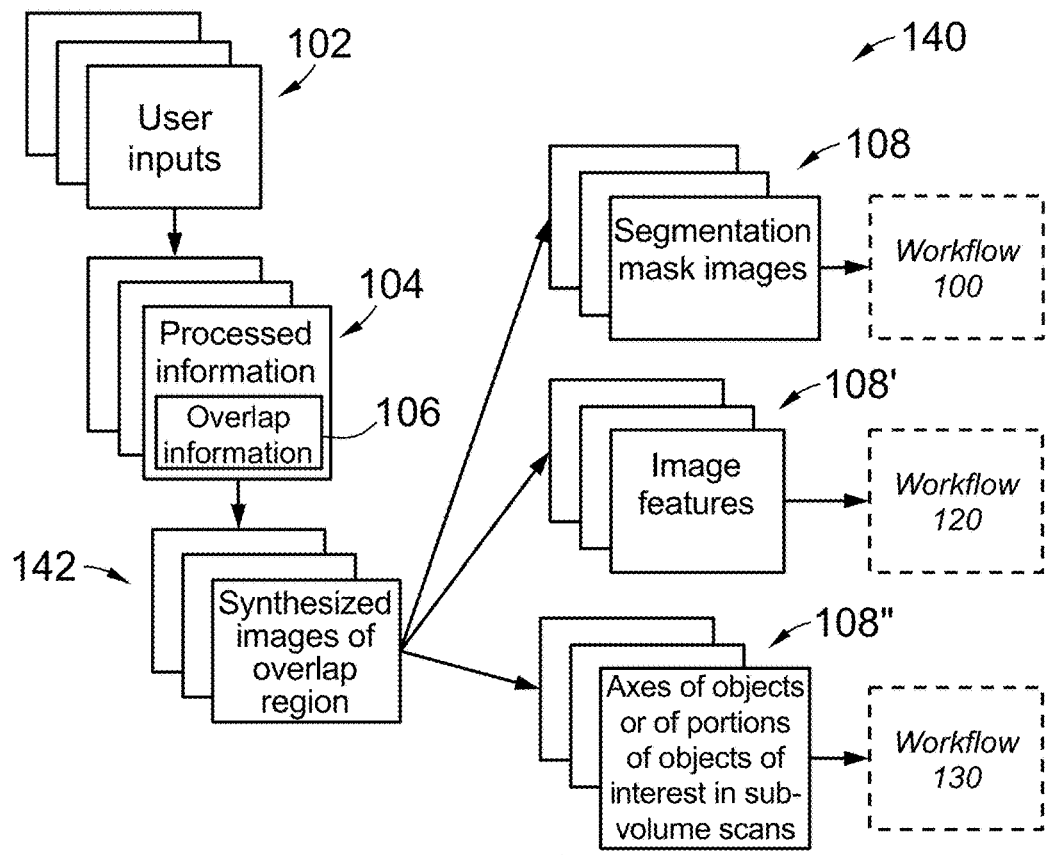
FIG. 6 is a schematic view of a workflow of correcting scan misalignment using overlap region synthesis according to an embodiment of the present invention.

FIG. 6 is a schematic view 140 of a workflow of correcting scan misalignment or effecting alignment if no overlap exists between sub-volume scans or if no usable overlap exists between sub-volume scans according to another embodiment of the present invention (also corresponding to usable overlap scenario (ii) above) using overlap region synthesis, as implemented by system 10.

User inputs 102 are received as illustrated in steps 72 and 73 of FIG. 2A and processed information 104 is fetched as illustrated in step 74 in FIG. 2A. Overlap information 106 is included in processed information 104, so this process is also initiated when overlap information 106 indicates that the usable overlap does not exist between a pair of sub-volume scans (which may be simply because no overlap exists between that pair of sub-volume scans).

In another embodiment, there are overlapping slices between two consecutive sub-volume scans. However, image(s) in the overlap can contain one or more types of CT artefacts that may cause difficulties for system 10 to extract useful features. As a result, image(s) that are affected by CT artefacts to such an extent that useful features cannot be detected are deemed not to be usable, so are discarded.

To account for the missing (usable) overlap, system 10 invokes overlap region synthesizer 34 to synthesize an overlap of two sub-volume scans using machine learning methods. For each pair of sub-volume scans where (usable) overlap does not exist, overlap region synthesizer 34 employs one or more pre-trained deep learning generative models stored in deep learning model store 64 to generate synthesized image slices 142 of missing or discarded overlap regions or slices thereof. The input images to the generative deep learning model(s) can be individual 2D slices or a sequence of 2D slices extracted from the raw sub-volume scan, or a combination of both. These models are trained by generative deep learning algorithms such as GANs (Generative Adversarial Networks) or Diffusion models. For example, to train such a model, slices at the two ends of a (e.g. leg) scan are input to overlap region synthesizer 34 to synthesize the "missing" slices in the middle. The synthesized slices are compared with the real middle slices. The model is continuously optimized until the difference between the synthesized image slices and real image slices cannot be reduced further.

In another example, overlap region synthesizer 34 generates synthesized images slices 142 of missing or discarded overlap regions or slices thereof by interpolating the shapes (for example, the contours on the slices) of the objects in the two consecutive sub-volume scans.

It should also be noted that overlap region synthesizer 34 may be used to generate synthesized images slices 142 to augment an overlap region that is inadequate (e.g. in size, in resolution or in content) for forming a sufficiently accurate transformation array.

The workflow then continues with the (synthesized) usable overlap, such as by generating segmentation mask images 108 according to workflow 100 of FIG. 3, by extracting image features 108' according to workflow 120 of FIG. 4, and/or by determining the axes of portions of object according to workflow 130 of FIG. 5.

Figure 7:
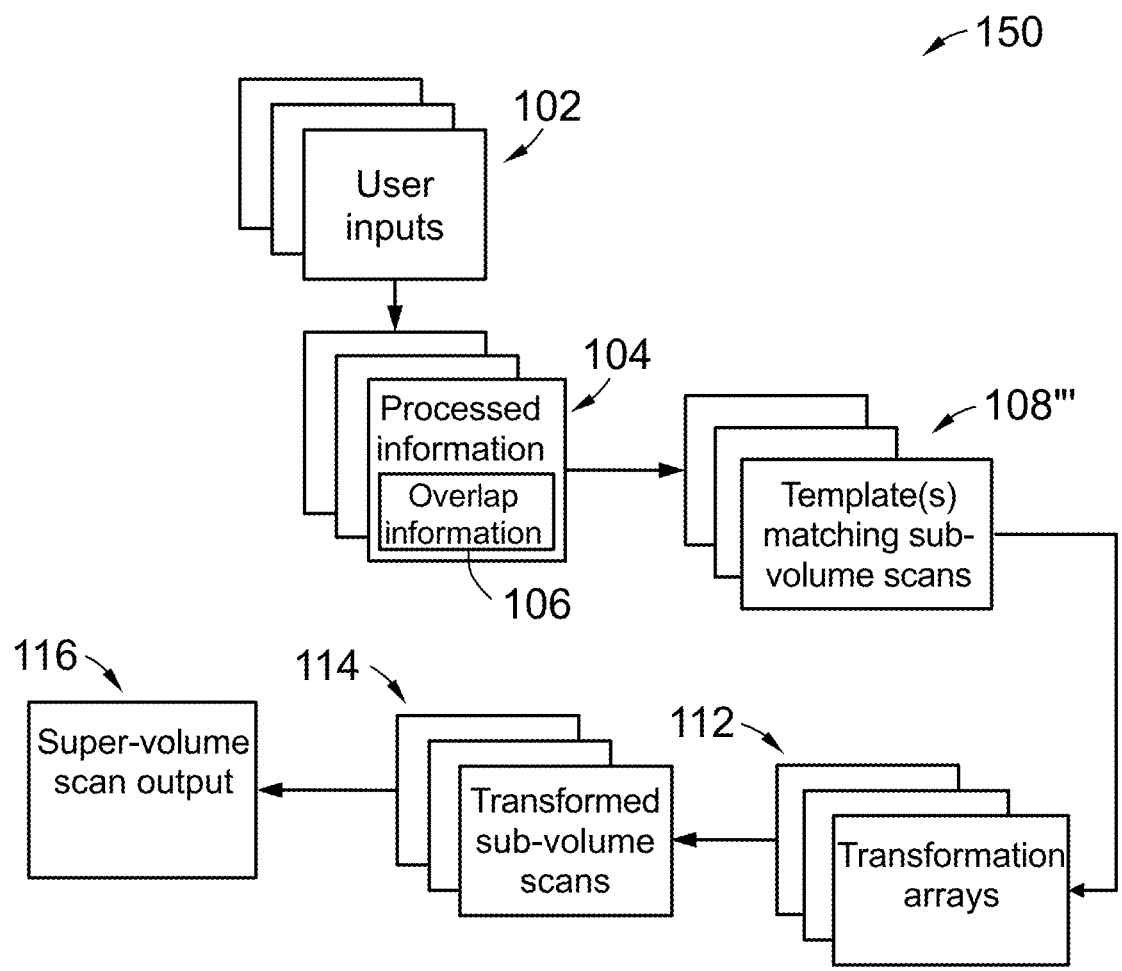
FIG. 7 is a schematic view of a workflow of correcting scan misalignment using consecutive scans and template matching according to an embodiment of the present invention.

FIG. 7 is a schematic view 150 of a workflow of correcting scan misalignment or effecting alignment if no overlap exists between sub-volume scans or if no usable overlap exists between sub-volume scans according to another embodiment of the present invention (also corresponding to usable overlap scenario (ii) above), without relying on overlap region synthesis, as implemented by system 10. It should again be noted, however, that workflow 150 can be employed with workflows 100, 120, 130 and/or 140 if it is desired to supplement the alignment result(s) of such workflows.

Referring to FIG. 7, user inputs 102 are received as illustrated in steps 72 and 73 of FIG. 2A and processed information 104 is fetched as illustrated in step 74 of FIG. 2A. Overlap information 106 is included in processed information 104, so this process is generally initiated when overlap information 106 indicates that usable overlap cannot be identified between the pair of consecutive sub-volume scans (which may be because no overlap exists between that pair of sub-volume scans). However, this process may also be employed to reduce computing time or to supplement the other approaches disclosed herein.

In order to align the respective two sub-volume scans, transformation array generator 42 controls image aligner 44b to match the consecutive first and second two- or three-dimensional sub-volume scans to at least one of one or more templates, typically by finding the template that most closely matches the consecutive first and second sub-volume scans. This may be done by image/mask matching, or by matching the metadata associated with the scans and the templates (indicative of, for example, the imaged anatomical region, imaging modality and imaging parameters), or a combination of both. The matching process results in the identification of one or more templates 108" that match (or most closely match) the sub-volume scans.

Transformation array generator 42 then generates one or more transformation arrays 112, calculated as described by reference to step 90 in FIG. 2B. This calculation is based on the sub-volume scans and the at least one matching template 108'''; the one or more transformation arrays 112 align the first sub-volume scan to the second sub-volume scan or the two scans to a common reference frame (such as that of each of the at least one matching template 108'''). The one or more transformation arrays 112 are applied to one of the sub-volume scans (or to two both sub-volume scans), thereby forming aligned first and second sub-volume scans 114.

The transformed sub-volume scans 114 and the final super-volume scan output 116 are generated as described by reference to steps 96 and 98 respectively of FIG. 2B.

Figure 8:
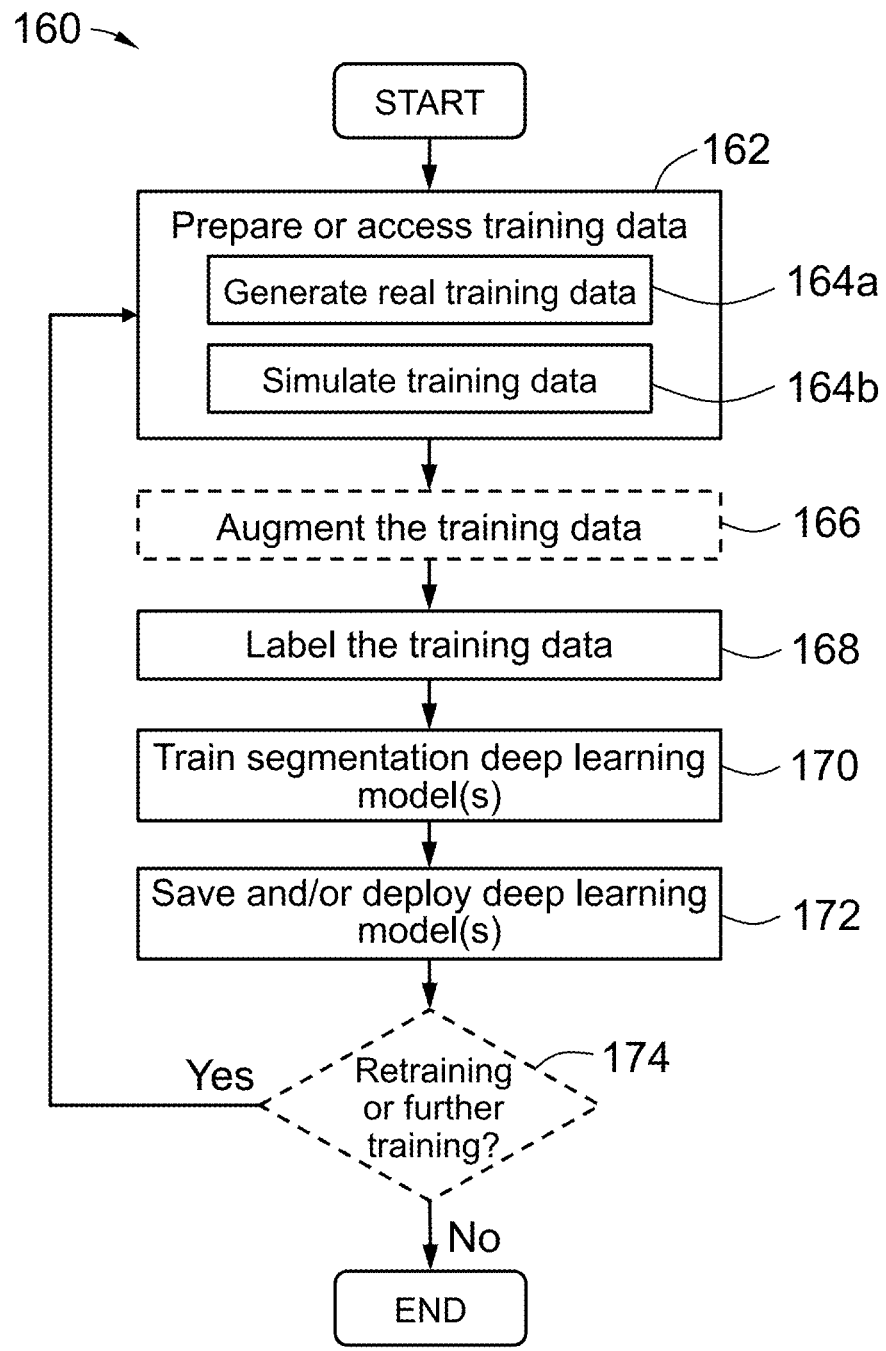
FIG. 8 is a flow diagram of the training of deep learning models according to an embodiment of the present invention.

FIG. 8 is a flow diagram 160 of the training process of the deep learning model or models stored in deep leaning model store 64. Training may be performed either with an optional training module (now shown) of system 10, or off-line. The types of deep learning models include segmentation model (s), which aim to generate mask images of the object of interest, feature extraction model(s), which aim to extract the image features of the object of interest, and generative model(s), which aim to predict new x-ray-based images for the given scan inputs. The object of interest is similar to the object of interest described by reference to FIG. 3, which can comprise muscle, bone, a calibration object, geometrically distinctive features, or any combination of these.

Referring to FIG. 8, at step 162 training data are prepared or accessed, the training data comprising x-ray-based images of the human body. The data can be individual 2D images or sequences of 2D images, or a combination of both. The training data may be real data, simulated data, or a combination of the two. In one example, the training data is generated 164a using real scans from patients whose data has been anonymized. In another example, the training data is simulated 164b based on the real scans including varying, for data augmentation purposes, various parameters such as the density of the tissue and different types and wavelengths of x-ray energies and thereby enlarge the training data set and simulate the different scanning scenarios. Noise and CT artefacts can also be added to make the data more realistic as they are common in real CT scans. In some examples, the training data comprises real data only or simulated data only. In another example, the training data comprises some real data and some simulated data. Hence, preparing the training data may involve—for example—generating (or sourcing) real training data (see step 164a) and/or simulating (or sourcing simulated) training data (see step 164b).

The process optionally includes step 166, where the training data is augmented using a data augmentation method, which may entail applying geometric transformations, applying color space transformations, and/or applying artificial noise to the training data to improve the robustness of the model training. Step 166 may also, or alternatively, entail dividing the training data into patches to increase the quantity of training data.

At step 168, the training data is labelled with the appropriate and correct labels. For the segmentation models, the input images are labelled with the corresponding object of interest to generate mask images. That is, each muscle voxel/pixel is labelled with the corresponding muscle tag, each bone voxel/pixel is labelled with the corresponding bone tag, and each calibration object is labelled with the corresponding calibration object tag. For the generative models, the labels are individual 2D x-ray-based images or 3D x-ray-based images collected in real clinical environments.

At step 170, one or more segmentation deep learning models are trained using the training images and labels stored in training data store 66 in FIG. 1. At step 172, the trained model or models are deployed for processing the sub-volume scans received at step 72 of FIG. 2A, by being stored in deep learning model store 64 of FIG. 1.

At optional step 174, system 10 determines whether retraining or further training is required. This may be done, for example, by checking whether the performance of the model satisfies particular criteria or needs to be improved, or the training data prepared or accessed at step 162 is new or there is additional training data. If retraining or further training is not required, processing ends, but if at optional step 174 it is determined that retraining or further training is required, processing returns to step 162.

In use, system 10 receives individual 2D x-ray-based image(s) or 3D image(s) of sequence(s) of 2D x-ray-based image(s) into one or more of the now trained deep learning models 64, which process the images and outputs images of the masks of the object of interest for segmentation models or output new x-ray-based images for generative models.

It will be understood to persons skilled in the art of the invention that many modifications may be made without departing from the scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of correcting misalignment of, or of aligning, images of one or more portions of a subject, the images obtained by a two- or three-dimensional medical imaging modality, the method comprising:
   in consecutive first and second two- or three-dimensional sub-volume scans, identifying at least one first portion in the first sub-volume scan and at least one second portion in the second sub-volume scan of a common anatomical feature or structure;
   selecting one or more feature extraction methods for extracting features from the first and second sub-volume scans from a plurality of feature extraction methods;
   extracting features of the first and second portions of the common anatomical feature or structure from the first and second sub-volume scans with the selected one or more feature extraction methods;
   determining, based on the extracted features of the first and second portions of the common anatomical feature or structure, a transformation that aligns or brings into registration the first and second portions;
   aligning the first and second sub-volume scans by applying the transformation and forming aligned first and second sub-volume scans;
   generating an aligned image from the aligned first and second sub-volume scans; and
   outputting the aligned image.

2. A method as claimed in claim 1, wherein
   the first and second sub-volume scans include an overlap region that comprises one or more image slices of the first sub-volume scan and respective one or more image slices of the second sub-volume scan that share respective common image slice locations with the one or more image slices of the first sub-volume scan.

3. A method as claimed in claim 2, wherein the overlap region comprises a plurality of sequential image slices of the first sub-volume scan and a respective plurality of sequential image slices of the second sub-volume scan.

4. A method as claimed in claim 1, wherein
   the first and second sub-volume scans include an overlap region that comprises one or more image slices of the first sub-volume scan and respective one or more image slices of the second sub-volume scan that share respective common image slice locations with the one or more image slices of the first sub-volume scan;
   the one or more image slices of the first sub-volume scan include the first portion of the common anatomical structure;
   the one or more image slices of the second sub-volume scan include the second portion of the common anatomical structure;
   the first portion and the second portions are identical a single portion of the common anatomical structure and have the same geometric shape; and
   the transformation brings into registration the one or more image slices of the first sub-volume scan and the respective one or more image slices of the second sub-volume scan.

5. A method as claimed in claim 1, comprising:
   generating respective segmentation mask images of one or more objects of interest or of the portions of the common anatomical structure and constructing a twoor three-dimensional model of the overlap region based on the segmentation mask images; and/or detecting coordinates of corners, edges and/or boundaries of features or objects in the overlap region.

6. A method as claimed in claim 1, comprising synthesizing one or more synthetic image slices so as to constitute or augment an overlap region of the first and second sub-volume scans.

7. A method as claimed in claim 1, comprising:
matching the consecutive first and second sub-volume scans to at least one of one or more templates, the one or more templates being historical, typical or idealized representations of at least part of the one or more portions of the subject or objects therein; and
determining, based on the at least one matching template, a transformation that aligns or brings into registration the first and second sub-volume scans;
aligning the first and second sub-volume scans by applying the transformation and forming aligned first and second sub-volume scans; and
generating a further aligned image from the aligned first and second sub-volume scans.

8. A method of correcting misalignment of, or of aligning, images of one or more portions of a subject, the images obtained by a two- or three-dimensional medical imaging modality, the method comprising:
matching consecutive first and second sub-volume scans to at least one of one or more templates, the one or more templates being historical, typical or idealized representations of at least part of the one or more portions of the subject or objects therein; and
determining, based on the at least one matching template, a transformation that aligns or brings into registration the first and second sub-volume scans;
aligning the first and second sub-volume scans by applying the transformation and forming aligned first and second sub-volume scans; and
generating an aligned image from the aligned first and second sub-volume scans; and
outputting the aligned image.

9. An image processing system for correcting misalignment of, or of aligning, images of one or more portions of a subject, the images obtained by a two- or three-dimensional medical imaging modality, the system comprising:
a feature extractor configured to:
in consecutive first and second two- or three-dimensional sub-volume scans, identify at least one first portion in the first sub-volume scan and at least one second portion in the second sub-volume scan of a common anatomical feature or structure;
select one or more feature extraction methods for extracting features from the first and second sub-volume scans from a plurality of feature extraction methods, and
extract features of the first and second portions of the common anatomical feature or structure from the first and second sub-volume scans with the selected one or more feature extraction methods;
a transformation generator configured to determine, based on the extracted features of the first and second portions of the common anatomical feature or structure, a transformation that aligns or brings into registration the first and second portions;
a sub-volume aligner configured to align the first and second sub-volume scans by applying the transformation and forming aligned first and second sub-volume scans; and a super-volume generator configured to generate an aligned image from the aligned first and second sub-volume scans; and
an output for outputting the aligned image.

10. A system as claimed in claim 9, wherein when the first and second sub-volume scans include an overlap region that comprises one or more image slices of the first sub-volume scan and respective one or more image slices of the second sub-volume scan that share respective common image slice locations with the one or more image slices of the first sub-volume scan;
the one or more image slices of the first sub-volume scan include the first portion of the common anatomical structure;
the one or more image slices of the second sub-volume scan include the second portion of the common anatomical structure; and
the first portion and the second portions are identical a single portion of the common anatomical structure and have the same geometric shape;
the transformation generator is configured to generate the transformation so as to bring into registration the one or more image slices of the first sub-volume scan and the respective one or more image slices of the second sub-volume scan.

11. A system as claimed in claim 10, wherein the overlap region comprises a plurality of sequential image slices of the first sub-volume scan and a respective plurality of sequential image slices of the second sub-volume scan.

12. A system as claimed in claim 9, comprising:
a segmenter configured to generate respective segmentation mask images of one or more objects or of the portions of the common anatomical structure, and a two- or three-dimensional model configured to construct a two- or three-dimensional model of the overlap region based on the segmentation mask images; and/or
an image feature detector configured to detect coordinates of corners, edges and/or boundaries of features or objects in the overlap region.

13. A system as claimed in claim 9, comprising an overlap region synthesizer configured to synthesize one or more synthetic image slices so as to constitute or augment an overlap region of the first and second sub-volume scans.

14. A system as claimed in claim 9, comprising:
an image aligner configured to match the consecutive first and second sub-volume scans to at least one of one or more templates, the one or more templates being historical, typical or idealized representations of at least part of the one or more portions of the subject or objects therein;
wherein the transformation generator is further configured to determine, based on the at least one matching template, a transformation that aligns or brings into registration the first and second sub-volume scans;
the sub-volume aligner is further configured to align the first and second sub-volume scans by applying the transformation and form aligned first and second sub-volume scans; and
the super-volume generator is further configured to generate a further aligned image from the aligned first and sub-volume scans.

15. An image processing system for correcting misalignment of, or of aligning, images of one or more portions of a subject, the images obtained by a two- or three-dimensional medical imaging modality, the system comprising:
an image aligner configured to match consecutive first and second sub-volume scans to at least one of one or more templates, the one or more templates being historical, typical or idealized representations of at least part of the one or more portions of the subject or objects therein;

a transformation generator configured to determine, based on the at least one matching template, a transformation that aligns or brings into registration the first and second sub-volume scans;

a sub-volume aligner configured to align the first and second sub-volume scans by applying the transformation and form aligned first and second sub-volume scans; and a super-volume generator configured to generate an aligned image from the aligned first and second sub-volume scans; and an output for outputting the aligned image.

16. A method of correcting misalignment of, or of aligning, images of one or more portions of a subject, the images obtained by a two- or three-dimensional medical imaging modality, the method comprising:

electronically transmitting the images to one or more remote computing devices; and electronically receiving an aligned image comprising at least portions of the images in aligned form from the remote computing devices;

wherein the aligned image is generated by the remote computing devices by at least:

(i) in consecutive first and second two- or three-dimensional sub-volume scans, (a) identifying at least one first portion in the first sub-volume scan and at least one second portion in the second sub-volume scan of a common anatomical feature or structure, selecting one or more feature extraction methods for extracting features from the first and second sub-volume scans from a plurality of feature extraction methods, and extracting features of the first and second portions of the common anatomical feature or structure from the first and second sub-volume scans with the selected one or more feature extraction methods; and/or (b) determining a first axis of an object in the first sub-volume scan and a second axis of an objects in the second sub-volume scans; and determining, based on the extracted features of the first and second portions of the common anatomical feature or structure, or based on the first and second axes, a transformation that aligns or brings into registration the first and second portions; and/or (ii) matching the consecutive first and second sub-volume scans to at least one of one or more templates, the one or more templates being historical, typical or idealized representations of at least part of the one or more portions of the subject or objects therein, and determining, based on the at least one matching template, a transformation that aligns or brings into registration the first and second sub-volume scans;

aligning the first and second sub-volume scans by applying the transformation and forming aligned first and second sub-volume scans; and generating an aligned image from the aligned first and second sub-volume scan.

17. A non-transitory computer-readable medium having stored therein computer program code comprising instructions configured to implement, when executed by one or more computing devices, the method of claim 1.

18. A method of correcting misalignment of, or of aligning, images of one or more portions of a subject, the images obtained by a two- or three-dimensional medical imaging modality, the method comprising:

in consecutive first and second two- or three-dimensional sub-volume scans, determining a first axis of an object in the first sub-volume scan and a second axis of an objects in the second sub-volume scans;

determining, based on the first and second axes, a transformation that aligns or brings into registration the first and second portions;

aligning the first and second sub-volume scans by applying the transformation and forming aligned first and second sub-volume scans;

generating an aligned image from the aligned first and second sub-volume scans; and outputting the aligned image.

19. A method as claimed in claim 18, wherein the first and second sub-volume scans include an overlap region that comprises one or more image slices of the first sub-volume scan and respective one or more image slices of the second sub-volume scan that share respective common image slice locations with the one or more image slices of the first sub-volume scan.

20. A method as claimed in claim 18, comprising:

generating respective segmentation mask images of one or more objects of interest or of portions of a common anatomical structure and constructing a two- or three-dimensional model of the overlap region based on the segmentation mask images; and/or detecting coordinates of corners, edges and/or boundaries of features or objects in the overlap region.

21. A method as claimed in claim 18, comprising determining the first and second axes using principal component analysis with segmentation masks or with 3D models of the objects or based on detected features of the objects.

22. A method as claimed in claim 18, comprising synthesizing one or more synthetic image slices so as to constitute or augment an overlap region of the first and second sub-volume scans.

23. A method as claimed in claim 18, comprising:

matching the consecutive first and second sub-volume scans to at least one of one or more templates, the one or more templates being historical, typical or idealized representations of at least part of the one or more portions of the subject or objects therein; and determining, based on the at least one matching template, a transformation that aligns or brings into registration the first and second sub-volume scans;

aligning the first and second sub-volume scans by applying the transformation and forming aligned first and second sub-volume scans; and generating a further aligned image from the aligned first and second sub-volume scans.

24. An image processing system for correcting misalignment of, or of aligning, images of one or more portions of a subject, the images obtained by a two- or three-dimensional medical imaging modality, the system comprising:

a feature extractor configured to, in consecutive first and second two- or three-dimensional sub-volume scans, determine a first axis of an object in the first sub-volume scan and a second axis of an objects in the second sub-volume scan;

a transformation generator configured to determine, based on the first and second axes, a transformation that aligns or brings into registration the first and second portions;

a sub-volume aligner configured to align the first and second sub-volume scans by applying the transformation and forming aligned first and second sub-volume scans; and a super-volume generator configured to generate an aligned image from the aligned first and second sub-volume scans; and an output for outputting the aligned image.

25. A system as claimed in claim 24, comprising an object axis determiner configured to determine the first and second axes using principal component analysis with segmentation masks or with 3D models of the objects or based on detected features of the objects.

26. A system as claimed in claim 24, comprising an overlap region synthesizer configured to synthesize one or more synthetic image slices so as to constitute or augment an overlap region of the first and second sub-volume scans.

27. A system as claimed in claim 24, comprising:
an image aligner configured to match the consecutive first and second sub-volume scans to at least one of one or more templates, the one or more templates being historical, typical or idealized representations of at least part of the one or more portions of the subject or objects therein;
wherein the transformation generator is further configured to determine, based on the at least one matching template, a transformation that aligns or brings into registration the first and second sub-volume scans;
the sub-volume aligner is further configured to align the first and second sub-volume scans by applying the transformation and form aligned first and second sub-volume scans; and
the super-volume generator is further configured to generate a further aligned image from the aligned first and sub-volume scans.

28. A system as claimed in claim 24, wherein
when the first and second sub-volume scans include an overlap region that comprises one or more image slices of the first sub-volume scan and respective one or more image slices of the second sub-volume scan that share respective common image slice locations with the one or more image slices of the first sub-volume scan;
the one or more image slices of the first sub-volume scan include the first portion of the common anatomical structure;
the one or more image slices of the second sub-volume scan include the second portion of the common anatomical structure; and
the first portion and the second portion are a single portion of the common anatomical structure and have the same geometric shape;
the transformation generator is configured to generate the transformation so as to bring into registration the one or more image slices of the first sub-volume scan and the respective one or more image slices of the second sub-volume scan.

29. A system as claimed in claim 28, comprising:
a segmenter configured to generate respective segmentation mask images of one or more objects or of the portions of the common anatomical structure, and a two- or three-dimensional model configured to construct a two- or three-dimensional model of the overlap region based on the segmentation mask images; and/or
an image feature detector configured to detect coordinates of corners, edges and/or boundaries of features or objects in the overlap region.

30. A method of correcting misalignment of, or of aligning, images of one or more portions of a subject, the images obtained by a two- or three-dimensional medical imaging modality, the method comprising:
synthesizing one or more synthetic image slices so as to constitute or augment an overlap region of consecutive first and second two- or three-dimensional sub-volume scans, the overlap region comprising one or more image slices of the first sub-volume scan and respective one or more image slices of the second sub-volume scan that share respective common image slice locations with the one or more image slices of the first sub-volume scan;
in the first and second sub-volume scans, identifying at least one first portion in the first sub-volume scan and at least one second portion in the second sub-volume scan of a common anatomical feature or structure;
determining, based on the first and second portions of the common anatomical feature or structure, a transformation that aligns or brings into registration the first and second portions;
aligning the first and second sub-volume scans by applying the transformation and forming aligned first and second sub-volume scans;
generating an aligned image from the aligned first and second sub-volume scans; and
outputting the aligned image.

31. An image processing system for correcting misalignment of, or of aligning, images of one or more portions of a subject, the images obtained by a two- or three-dimensional medical imaging modality, the system comprising:
an overlap region synthesizer configured to synthesize one or more synthetic image slices so as to constitute or augment an overlap region of consecutive first and second two- or three-dimensional sub-volume scans;
a feature extractor configured to, in the first and second sub-volume scans, identify at least one first portion in the first sub-volume scan and at least one second portion in the second sub-volume scan of a common anatomical feature or structure;
a transformation generator configured to determine, based on the first and second portions of the common anatomical feature or structure, a transformation that aligns or brings into registration the first and second portions;
a sub-volume aligner configured to align the first and second sub-volume scans by applying the transformation and forming aligned first and second sub-volume scans; and
a super-volume generator configured to generate an aligned image from the aligned first and second sub-volume scans; and
an output for outputting the aligned image.

* * * * *